United States Patent [19]

Rahman et al.

[11] Patent Number: 5,229,506

[45] Date of Patent: Jul. 20, 1993

[54] PREPARATION OF CELLULOSE AMINOMETHANATE

[75] Inventors: Matiur Rahman; Douglas J. Bridgeford, both of Champaign, Ill.

[73] Assignee: Teepak, Inc., Westchester, Ill.

[21] Appl. No.: 365,267

[22] Filed: Jun. 12, 1989

[51] Int. Cl.$^5$ .................. A22C 13/00; C08B 15/06
[52] U.S. Cl. ........................... 536/30; 536/32; 106/169; 106/186; 106/198; 138/118.1; 426/135; 426/138; 428/34.8
[58] Field of Search ............ 536/30, 32; 106/169, 106/186, 198; 426/138, 135; 138/118.1; 428/34.8

[56] References Cited

U.S. PATENT DOCUMENTS

| | | | |
|---|---|---|---|
| 1,771,461 | 7/1930 | Lilienfeld | 106/203 |
| 2,129,708 | 9/1938 | Schreiber | 106/203 |
| 2,134,825 | 11/1938 | Hill et al. | 536/30 |
| 3,291,789 | 12/1966 | Bridgeford | 536/61 |
| 3,557,082 | 1/1971 | Bridgeford | 536/61 |
| 4,404,369 | 9/1983 | Huttunen et al. | 536/30 |
| 4,456,749 | 6/1984 | Mandell et al. | 536/30 |
| 4,486,585 | 12/1984 | Turunen et al. | 536/30 |
| 4,526,620 | 7/1985 | Selin et al. | 536/30 |
| 4,530,999 | 7/1985 | Selin et al. | 536/30 |
| 4,567,255 | 1/1986 | Eklund et al. | 536/30 |
| 4,583,984 | 4/1986 | Turunen et al. | 8/125 |
| 4,639,515 | 1/1987 | Turunen et al. | 536/30 |
| 4,762,564 | 8/1988 | Bridgeford | 106/204 |
| 4,777,249 | 10/1988 | Bridgeford | 536/30 |
| 4,789,006 | 12/1988 | Bridgeford et al. | 138/118.1 |

FOREIGN PATENT DOCUMENTS 85890246  4/1986  European Pat. Off. .

Primary Examiner—Thurman K. Page
Assistant Examiner—G. S. Kishore
Attorney, Agent, or Firm—Howard M. Ellis; Michael L. Dunn

[57] ABSTRACT

An improvement to the process for synthesizing cellulose aminomethanate is disclosed which comprises slurring cellulose in low concentrations of aqueous caustic solutions, in the presence of urea, and steeping the slurried mixture, at from about 2° C. to about −15° C., for a time sufficient to permit swelling of the cellulose and uniform distribution of the urea. Cellulose aminomethanate manufactured from product prepared in accord with this process, has a uniform distribution of aminomethanate throughout the cellulose at the molecular level and comprises a suitable product for manufacturing sausage casing.

7 Claims, No Drawings

PREPARATION OF CELLULOSE AMINOMETHANATE

BACKGROUND OF THE INVENTION a) Field of the Invention

This invention relates to a process for synthesizing cellulose aminomethanate which has utility in the manufacture of cellulose films or fibers, particularly the manufacture of regenerated cellulose film.

b) History of the Prior Art

Cellulose xanthate, dissolved as viscose, has been utilized for many years in the manufacture of regenerated cellulose film which has particular utility as sausage casings. With the increase in environmental awareness, concerns have been raised to the environmental management of flammable and toxic reactants and by-products of the viscose manufacturing process. The rapidly escalating cost of by-product management, coupled with the intrinsic costs of additives, such as plasticizers, which are often necessary when utilizing viscose for regenerated cellulose films, has forced the regenerated cellulose industry to search for viable alternatives to current viscose manufacturing processes.

One alternative, which has more recently been the focus of research for possible replacement of the viscose process, particularly in the sausage casing industry, is the use of ammonia derivatives, such as urea, as precursors reacted with cellulose to form a soluble cellulose derivative. The use of such materials is preferable as by-products are easily managed and do not appear to represent significant environmental impact. U.S. Pat. Nos. 1,771,461; 2,134,825; and 2,129,708 comprise some of the early work in that technology, demonstrating that film products are obtainable that have utility. Though the final products formed showed potential for use as a film, it wasn't until U.S. Pat. No. 4,789,006 that a product was produced having a combination of properties that made it appropriate for use as sausage casings.

Various different terminology has been used to describe the products of cellulose and urea, such as cellulose aminoformates, cellulose carbamates, cellulose aminomethanoates and cellulose aminomethanates as adopted in U.S. Pat. No. 4,789,006. To deter further confusion, the products that are formed with cellulose and urea, as presented in the above patents and hereinafter, will be referred to as cellulose aminomethanates.

Even though a cellulose aminomethanate product can now be made which is suitable for use as a sausage casing, problems still exist in the manufacturing process occasioned by the difficulty of using prior art carriers and swelling agents, such as liquid ammonia, to obtain uniform distribution of the urea through the cellulose material prior to the formation of the cellulose aminomethanate. This need for uniform distribution of the urea is disclosed in U.S. Pat. No. 4,404,369 and other prior art.

It is an object of this invention to improve the distribution of urea throughout the cellulose structure prior to the formation of cellulose aminomethanate, without the use of very low temperature, liquid ammonia processing.

It is another object of this invention to provide an improved cellulose aminomethanate material having uniform distribution of aminomethanate substituent.

These objects and more are achieved by an improvement to the process for synthesizing cellulose aminomethanate which comprises slurrying cellulose in low concentrations of aqueous caustic solutions, in the presence of urea, and steeping the slurried mixture, at from about 2° C. to about −15° C., for a time sufficient to permit swelling of the cellulose and uniform distribution of the urea.

It was found that when the cellulose aminomethanate is manufactured from product prepared in accord with this process, it has a uniform distribution of urea throughout the cellulose at the molecular level and comprises a suitable product for manufacturing sausage casing.

DETAILED DESCRIPTION OF THE INVENTION

The synthesis of cellulose aminomethanate suitable for use in the manufacture of sausage casings involves at least three controlling elements. First, the cellulose structure of the material used must be impregnated with urea in a uniformly distributed manner to assure that a final product will be obtained having suitable consistency for the manufacture of sausage casings. Second, the thus impregnated cellulose structure must be treated to uniformly and efficiently decompose the urea to form the reagent for the cellulose aminomethanate derivative. Third, the thus formed derivative usually is processed to provide a storageable raw material for the subsequent manufacture of sausage casing.

The two most critical of the above elements are the obtaining of a uniform urea distribution in the cellulose and the uniformity and efficiency of the decomposition process forming the derivative.

In order to achieve uniform distribution, it has been found that the hydrogen bonded networks and associated crystalline structure of cellulose need to be broken, at least partially, to make the cellulose highly accessible to the urea. In the process of U.S. Patent 4,404,369 this accessibility is accomplished by steeping cellulose in a solution of urea in liquid ammonia, the liquid ammonia apparently acting to cause the cellulose to swell, which makes the cellulose more accessible to the urea. The product of such processing appears to produce a suitable distribution of urea within the cellulose for manufacturing sausage casing as described in U.S. Pat. No. 4,789,006.

In U.S. Pat. Nos. 2,129,708 and 2,134,825 the method of achieving distribution of the urea is by steeping cellulose in urea dissolved in sodium hydroxide at 25° C. to 65° C. temperature. Such process has merit when using low molecular weight cellulose but when high molecular weight cellulose is utilized a uniform distribution cannot be obtained unless the concentration of caustic is so high as to decompose the high molecular weight cellulose to a lower molecular weight.

In the recent prior art, a degree of uniformity was achieved in mixing high molecular weight cellulose with urea by utilizing concentrations of caustic of 10% to 30% thus attaining a higher degree of swelling. This process is undesirable however, as the removal of greater amounts of caustic requires multiple pressing and washing of the product with aqueous urea before drying and heating.

It has been discovered that if the cellulose is slurried in a minimum volume of a low caustic concentration aqueous solution, which also contains an appropriate quantity of urea, and the slurry is steeped at a temperature at between about 2° C. and about −15° C. and · preferably from about 0° C. to about −10° C., that the caustic will efficiently cause the cellulose to swell and accept uniform distribution of the urea. With the utilization of low concentration caustic solutions, of minimum volume, at low temperature, no washing need be done or adequate subsequent washing was achieved using only one dilution with aqueous urea and one pressing. Thus, instead of repeated washing and pressing to remove caustic as required by the prior art, the process of this invention achieves an adequate product using no washing or a single washing step resulting in material savings.

By slurried is meant that the cellulose material has been divided into pieces and is intimately intermingled with a urea containing aqueous caustic solution. The size of the cellulose pieces can vary greatly with the form that the cellulose is in as well as the time that is available for decomposing the cellulose pieces into such form that the caustic solution will break down and thoroughly wet the cellulose. It was found that when using thin cellulose, dissolving pulp sheets that cellulose pieces smaller than several inches square were generally adequately broken down and wetted within 5-10 minutes, a reasonable time frame for commercial use.

The concentration of the aqueous solution used should generally range from about 2 to about 10% caustic by weight and from about 12 to about 35% urea by weight. A preferred aqueous solution would contain from about 4 to about 8% caustic and from about 15 to about 30% urea by weight. The volume of solution used in the process should be minimized for economics. Generally, a ratio of combined caustic and urea containing aqueous solution to cellulose should not be more than about 15:1 and preferably about 10:1 or less.

The cellulose will generally be wetted very quickly utilizing the low caustic, urea containing aqueous solution of this invention, however a wetting agent may be used if desired. It is preferred to agitate or mix the components so that a uniform mixture is quickly obtained, however mixing is not always necessary depending upon the form of cellulose used and/or the method of addition of the caustic and urea practiced. For example, the cellulose may comprise an aqueous slurry to which caustic and/or urea are added in amounts appropriate to form a solution with the aqueous component of the slurry or a portion thereof.

Thus, it is within the contemplation of this invention to include the addition of high caustic and/or urea concentrations to an aqueous cellulose slurry to form a low caustic concentration slurry, as well as treating the cellulose material with a low concentration caustic solution.

Generally, it is desirable to initially mix the cellulose with the caustic/urea solution at ambient temperature, then reduce the temperature of the mixture to from about 2° C. to about −15° C. and preferably about 0° C. and below. However, cold caustic/urea solution can be added to a higher temperature cellulose material and the reverse, or, both may be cold or hot. In a similar manner, caustic and urea can be added to a cooled cellulose slurry or the reverse. The key requirement of the invention is that the cellulose, the caustic and the urea be brought together at a temperature of about 2° C. to about −15° C. at the aforesaid concentrations and relative weight ratios, and steeped for a sufficient time to permit swelling of the cellulose and impregnation of the urea into the swelled cellulose fiber.

Generally, in batch processing of a thin cellulose pulp slurry, steeping at the lowered temperature for from about 30 minutes to an hour is adequate. Generally the slurry should be steeped for an amount of time sufficient to swell the cellulose and allow migration of the urea into the cellulose structure however, steeping can be continued as long as no significant adverse effect is imposed upon the cellulose structure.

Pressing and optionally washing the intermingled urea and cellulose is typically the next step in the production of the cellulose aminomethanate. The pressing step acts to reduce the amount of caustic to be removed and accordingly the amount available to react with excess urea. The washing step, with aqueous urea, acts to remove remaining caustic. Generally only one pressing is necessary and one washing with aqueous urea. The washed slurry is then filtered and/or centrifuged to a desired press weight ratio.

The following examples are provided to exemplify the invention and are not meant to be a limitation thereof.

EXAMPLE 1

Ten grams of high purity, high alpha content, 510-550 average degree of polymerization determined from viscosity ($DP_V$) dissolving cellulose pulp sheeting (Buckeye V-65), was cut into small pieces (1"×¼") and placed in 100g of an aqueous solution containing 6% (W/W) sodium hydroxide and 22% (W/W) urea, at room temperature. The sheet structure quickly became thoroughly wet and a slurry was formed by mixing with a spatula to assure a uniformity. The mixture was then cooled to a temperature of below about 0.C, over a one hour time period with occasional stirring. The appearance of the mixture changed from a slurry of wet fiber to a uniform, pudding-like consistency mixture.

The mixture was thereafter diluted with 500 g of 25% aqueous urea, thoroughly mixed for 30 minutes, and filtered under suction in a Buchner funnel. The filtered product was pressed into a pad having a weight of 33.4 g.

The filtered and pressed pad was placed in an oven at 100° C. 110° C. for one (1) hour after which the temperature was raised to 130°-135° C. The pad was weighed at 30-40 minute intervals until the stoichiometric weight loss indicated that cellulose aminomethanate had been formed in accord with U S. patent application Ser. No. 365,271, now a U.S. patent Ser. No. 4,997,934, entitled Cellulose Aminomethanate by Weight Loss Monitoring, filed on even date herewith and incorporated by reference. One half of the reaction product, representing about 5 g of cellulose aminomethanate, was washed with water in a blender, filtered and thereafter was dissolved in cold caustic-zincate. The final composition of cellulose/caustic/zinc oxide was adjusted to 7%/9%/1% (W/W). The mixture was dispersed by stirring at room temperature and thereafter was cooled at -15° C. for storing(three days).

Upon thawing, a glass clear and fiber free solution was obtained. The solution was centrifuged to remove air and handcast onto a glass plate using a 30 mil drawbar to form a film. The film was coagulated and regenerated in a conventional viscose coagulation-regeneration bath, washed for 15 minutes with running tap water and dried on a plastic hoop at room temperature to give a film with a rewet Mullen burst strength of 14.2-15.5 psi.

EXAMPLE II 1.06 kilograms of cellulose (Buckeye V-65, 510-550 $DP_V$) pulp sheeting (cut into $\frac{1}{4}"\times 1"$ pieces), was mixed with 10 kg of 6%/20% (W/W) caustic/urea at ambient temperature. After about 10-15 minutes, the mixture was placed in a freezer and cooled to about $-5°$ C. with occasional stirring. The mixture was maintained at this temperature for 1 hr., then transferred into a plastic 30 gallon tank containing 70 kg of 20% (W/W) aqueous urea and stirred for 30 minutes.

The diluent was then pumped out of the tank through a nylon mesh filter and the cellulose-urea mixture was centrifuged in a washing machine for 15 minutes to remove excess steep liquor. The centrifuged material was then pressed into a pad having a press-weight ratio (PWR) of 3.82, which is calculated by dividing the wet weight of the pad by the weight of the dry cellulose starting material.

The pad was divided into six (6), approximately equal portions, each of which were placed in separate metal trays and left overnight at room temperature. Each portion of the pad was partially dried in an oven at from 100°-110° C. and then heated at 135° C. ($\pm 3°$ C.) in an oven until a stoichiometric weight loss, indicating reaction of the cellulose and urea, was achieved.

On testing, the solubility of the resulting cellulose aminomethanate as in Example I, a glass clear, viscous solution was obtained. Handcast film manufactured from the solution in accord with Example I resulted in a rewet Mullen burst strength of 14 psi.

EXAMPLE III 4.678 Kg. of high quality, high alpha content cellulose pulp (510-550 $DP_V$ Buckeye V-65), in $11"\times 14"$ sheets, slowly added to 46 kilos of an aqueous 6% sodium hydroxide, 20% urea solution and steeped by holding at $-2°$ C. in a $12"\times 18"\times 18"$ tank for 1 hour. The addition was slow to avoid gelatinization or swelling around the book and prevent blinding of the remainder of the sheets in the interior of the book. The highly swollen sheets appeared as a mulch or slurry in the steeping liquid and no excess liquid was observed.

At the end of this steeping period the slurry was dumped into a 20% aqueous urea solution to form a total of 110 kilos of solution at 18° C. The slurry was mixed for 1 hour to secure solubility equilibrium and dispersion of the material. Liquid was filtered off the slurry until 64 kg. of slurry remained. Additional 20% aqueous urea solution was added to form about 110 kilos of solution. The first filtered extract contained a concentration of approximately 1.4% sodium hydroxide. The second extract had a pH of 12.4, indicating that the low caustic concentration allowed a decrease of the number of extractions.

The slurry was centrifuged to remove excess extract liquid and 21 Kg of mixed cellulose/urea pad was obtained from the 4.678 kg. of initial cellulose material (PWR 4.49). The material was then placed in cake pans at about 4 cm thickness and dried overnight at 71° C. in a high air velocity evaporation/drying (Despatch) oven.

Approximately one half of the weight of the dried material was separated out and reacted by preheating the dried urea impregnated cellulose to 93° C. for about 2 hours in the Despatch oven and then curing at 168° C. for 120 minutes. The resulting cured material had a light tan uniform color and a measured nitrogen content of about 2.4%. The product was readily soluble in 9% sodium hydroxide and 1% zinc oxide solution at $-5°$ C. to provide a clear, almost fiber-free, solution.

It is generally known that the presence of small amounts of sodium hydroxide in high temperature, heat treated, urea-impregnated cellulose will result in some saponification of the urea, as well as discoloration, degradation, and depolymerization of the cellulose. An advantage of using low caustic concentrations is that it minimizes the number of extractions that may be required to reach a non-critical residual content level. Thus, a urea impregnated cellulose can be conveniently attained which can be heat treated at high temperatures for short time periods with little resulting discoloration. Only the reduction in DPV due to high temperature cure takes place and little due to appreciable amounts of residual caustic as found in other processes.

The extraction may also be achieved by coupled ion exchange-extraction loop, which can be conducted at any temperature desired, even at temperatures below 0° C. The lower temperature, particularly after a preliminary extraction to remove the dissolved cellulose, permits the recycling of urea solutions with minimal loss of urea from degradation due to the presence of the sodium hydroxide.

The coupled loop process permits the concentration of the the extracted sodium hydroxide which permits the recycling of the more concentrated caustic laden urea solution to subsequent steeping steps. However, since the amount of steep liquor required for the cellulose in steeping steps is preferably small because of the general preference for maintaining liquor ratios of about 1:10 to about 1:15, not all of the alkaline urea solutions may be re-usable in recycling.

EXAMPLE IV

Synthesis of 850 $DP_V$ Cellulose Aminomethanate

This example illustrates the conversion of a 1065 $DP_V$ dissolving cellulose wood pulp (Buckeye V-5) to a soluble cellulose aminomethanate using a 3% sodium hydroxide solution, 20% urea combination at a steeping temperature range of $-10°$ to 0° C. This constitutes a harsh test of the utility of a cold, low caustic concentration steep in making a soluble aminomethanate from a very high $DP_V$ cellulose furnish.

1807 grams of high alpha sulfate pulp having a 1065 $DP_V$ (Buckeye V-5 dissolving pulp). in the form of $11\frac{1}{2}"\times 10"$ sheets, was steeped as three (3) sheet books spaced by polyethylene coarse screens in 21 kilograms of $-3°$ C. steep liquor containing 3.0% sodium hydroxide and 20.0% urea. The books were sandwiched between polyethylene screen spacers on both sides of the sandwich when introduced into the steep tank. The 21 kilos of cooled caustic and urea solution were introduced through a funnel and rubber tube to the bottom of the steep tank slowly over a 20 minute period. This slow flooding of the tank was done to avoid blinding of the books by gelatinization. The books were thin, three sheet books, to facilitate uniform wetting of the high $DP_V$ cellulose pulp by the cold, caustic steep liquor. The sheets appeared to be very uniformly wetted.

The wetted sheet sandwich was covered with a thin layer of the steep liquid in the steep tank and the entire apparatus was placed in a freezer overnight where it reached a temperature of $-10°$ C. The next morning the contents of the steep tank were allowed to warm slowly to $+5.$C and the liquid was decanted off in two (2) portions. The first portion comprised 5 kilos of liquid at 2.94% sodium hydroxide concentration. The second portion comprised 1.5 kilos of liquid at 2.98% sodium hydroxide concentration.

To determine the approximate amount of cellulose dissolved in the decantate, the solution was analyzed for cellulose by adding excess acid to 800 grams of the mixed decantate. About 0.12 grams of cellulose were found and the amount of cellulose dissolved from the books was calculated at about 1 gram in the 6.5 Kg decanted liquid.

The drained, swollen sheet sandwiches were dumped into 100 kilograms of 20% urea at 20° C. and mixed as slurry for 30 minutes. A single extraction with 20% aqueous urea was used to remove excess caustic because of the low concentration sodium hydroxide solution used and the desire to deliberately leave some residual sodium hydroxide in the urea/cellulose pad so that some depolymerization of the very high $DP_V$ pulp would occur during the heating and curing stages.

The mixed slurry was pressed for removal of liquid. The pH of the pressed out liquid was 12.7. The sheets were slurried in an extraction tank with an aqueous urea solution, filtered off, and centrifuged to a weight of 6167 grams for a press weight ratio of 3.55. This pressed weight ratio corresponds to about 51% addition of urea, to the cellulose, based on the cellulose weight. The resulting urea/cellulose pad was dried in a hood at ambient temperature, overnight, then dried to approximately constant weight in a high air velocity, evaporation oven at 71° C.

The high molecular weight, low caustic content steeped product was heat reacted in three (3) time periods to secure maximum information from the material. The batch was divided into three (3) portions for separate reaction at an air temperature of 168° C. in the evaporation oven. Each portion was prepared in 3.0 cm layers. The first portion was heated for 45 minutes, the second for 65 minutes and the third for 90 minutes. These relatively brief times were considered appropriate because of the high molecular weight of the cellulose, which could be easily insolubilized by a low extent of cross-linkage. It is known that heating cellulose at high temperature or extended periods of time can give rise to cross-linking.

The cellulose aminomethanate product heated for 45 minutes was determined to have a 1.07% nitrogen content. It had poor solubility in a 9.0% caustic/1% zinc oxide mixed solvent at 0° to −5° C. The portion cured for 65 minutes was determined to have a 1.79% nitrogen content and showed good solubility in the above noted cold sodium hydroxide/zinc oxide solvent at −5° C. The third portion cured for 90 minutes had a 2.57% nitrogen content and showed the best solubility in the caustic/zinc oxide mixture at about 96–97%.

All three portions were made into 3% polymer concentration test solutions for determination of solubility because of the high $DP_V$. Each solution was pourable and, at 10° C., had a similar viscosity to that of a commercial viscose solution. The solutions, especially the 60 minute batch, were almost water clear and under polarized light showed very few fiber fragments.

The $DP_V$ of each of the three cellulose aminomethanate portions was determined. The portion heated 45 minutes showed approximately 840 $DP_V$; The portion heated 60 minutes showed approximately 845 $DP_V$; and, the portion heated 90 minutes showed approximately 872 $DP_V$. These results for a well dissolved cellulose aminomethanate were particularly surprising in view of the very low caustic concentration used in the steep step and the use of a single extraction step.

EXAMPLE v 4.273 Kg of 640–690 $DP_V$, high alpha content dissolving pulp (Buckeye V-60), comprised of single 27″×18″ sheets, was added vertically into 42 kg of an aqueous 6% NaOH/20% urea solution, at 20° C. in an 18″×24″×18″ tank held in a 0-2.C walk-in-cooler. The sheets were made into a slurry by mechanical mixing and the slurry was cooled to near 2° C. with four paddle mixing over a 16 hour period.

The tank containing the slurry was then placed in a freezer set at −26° C. and cooled with further mixing to −13° C. The slurry appeared as a semi-solid mass.

The tank and contents were removed from the freezer and allowed to stand at 27° C. for 6 hours. The semi-solid mass was cut into 3″ slabs which were placed in 100 kg of 20% urea solution, having a temperature of 45° C., to aid in melting/slurrying the slab into the solution.

The slurry was mixed 30 minutes by stirrer, excess liquid drained off through a filter, and then the residual mass was extracted with 100 kg of 20° C., 20% urea solution. The resulting slurry had a pH of 12.8.

The filtered slurry was centrifuged and pressed to a PWR of urea-cellulose corresponding to an 84% urea loading on the cellulose. The pressed material was placed in metal screen trays at ⅛ inch depths and dried at 200° F.

The dried urea-impregnated cellulose pulp product was thereafter heated at 168° C. air temperature for 90 minutes with a 10% weight loss. A uniform tan material was obtained.

The crude tan cellulose aminomethanate product was slurry washed in 100 kg portions of hot water and dried at 93° C. yielding 4.08 kg of final product.

A portion of the dried product was dissolved in an aqueous solution containing 9% NaOH/1% ZnO at 20° C. The polymer rapidly gelatinized even at 20.C and rapidly dissolved as the temperature was lowered to −5° C. A clear, essentially fiber-free polymer dope was obtained.

The dope was centrifuged for 15 minutes at 1500 g to remove air. A film was cast from the unfiltered dope. 30 mil draw-downs were made on glass plates and neutralized at 28° C. in a typical coagulation/regeneration acid bath of 12% sulfuric acid and 20% sodium sulfate for 5 minutes. The resulting gel cellulose aminomethanate film was washed in water to neutral pH and dried on 16.5 cm plastic hoops at 25° C.

The dried film had a 36 g/$M^2$ basis weight and showed a rewet Mullen burst strength of 12 psi.

EXAMPLE VI 2 154 Kg of 640–690 $DP_V$ Buckeye V-60, high alpha content dissolving pulp sheets (8), were slowly wet out in 55 kg of an aqueous 2% NaOH/20% urea/0.01% Duponol sodium Lauryl sulfate wetting agent solution, at −6° C. The sheets were introduced into the liquid slowly enough so that air was displaced from the sheets during introduction and were steeped for 20 minutes. The sheets were then laid horizontally on a grid in a vacuum couch to permit subsequent pressing with a rubber dam after the steep.

The sheets were pressed to a PWR of 3.70 and dried at 66° C. for 16 hours to constant weight. The next day the sheets were suspended from hangers in a high air velocity evaporation oven at 82° C. for one hour to assure constant weight. The dried urea-impregnated cellulose sheets were weighed (3787 gm) and thereafter cured at 146.C air temperature for 150 minutes with a 17% weight loss. The weight was checked at ½ hour intervals during the cure and the sheets were rotated from right to left in the oven to provide uniform thermal history for each sheet. After cure the sheets were washed thoroughly in hot tap water, then dried at 71° C. to about 6% moisture content. The resulting white, cellulose aminomethanate sheets were tested to determine nitrogen content(2.08%) and $DP_v$(557).

The cellulose aminomethanate product was tested for filterability through a 60 micron challenge polypropylene filter and exhibited a filterability index of 6.6. The filterability index (FI) was determined by preparing a polymer dope comprising several hundred milliliters of 6% aqueous cellulose aminomethanate solution into an aqueous solution containing 9% caustic and 1% zinc oxide. The solutions are mixed and thereafter pressured through the 60 micron filter at 80 lbs/sq. in. The total weight of material($W_1$) passing through the filter for the first 10 minutes($T_1$) and the total weight of material ($W_2$) for the first 30 minutes($T_2$) is determined. The filterability index is determined using the aforesaid values in the following formula:

$$FI = [T_2/W_2 - T_1/W_1] \times 50$$

Filterability index provides a good estimate for projecting the filtering capacity of solutions and the suitability of solutions for manufacture of films. A filterability index of below about 10 provides excellent results.

A first film was cast from the polymer dope using a 30 mil draw down on glass plates and thereafter neutralized at 25° C. in a typical coagulation/regeneration acid bath of 11% sulfuric acid and 20% sodium sulfate for 10 minutes. The resulting gel cellulose aminomethanate film was washed in lukewarm water to neutral pH and dried on 16.5 cm plastic hoops to 5% moisture content at 90° C.

The dried film tested as having a rewet Mullen burst strength of 16 psi.

A second film was cast from the polymer dope(10° C.) using a 30 mil draw down on a glass plate. A 14 lb. basis weight abaca fiber based saturating web was then laid on the draw down and the dope was allowed to penetrate the web for 2 minutes. The thus fiber reinforced drawdown was neutralized, coagulated, regenerated, dried as above for the first film and tested to have a rewet Mullen Burst strength of 45 psi. Similar films made from polymer dope allowed to stand several hours at 6° C. were slightly clearer and had higher burst strengths, however the material gelled in about 3 days at this temperature.

EXAMPLE VII 4.36 Kg of 640-690 $DP_v$ Buckeye V-60, high alpha content dissolving pulp sheets (16), were slowly wet out in 90 kg of an aqueous 3% NaOH/30% urea/0.01% Duponol sodium Lauryl sulfate wetting agent solution, at −10° C. The wetted sheets were mixed thoroughly as a pasty slurry and were allowed to steep for 60 minutes.

The slurry was brought to about 15° C. by mixing rapidly with 30 Kg of 30% urea solution prepared in hot water. The resulting 120 Kg of diluted slurry was made into four uniform thin sheets using a vacuum couch. The sheets were about 22"×40" in size and were placed in stainless steel trays for drying at 60° C. for 6 hours. The sheets were then dried at 82°0 C. in a high velocity evaporation oven to a constant weight of 6174 gms.

The dried urea-impregnated cellulose sheets were thereafter cured at 146° C. air temperature for 125 minutes to a 15.7% weight loss. The weight was checked at three intervals during the cure. After cure the sheets were washed thoroughly in hot tap water, then dried at 66° C. overnight. The resulting cellulose aminomethanate crumb was tested to determine nitrogen content(1.92%).

A polymer dope comprising several hundred milliliters of 6% aqueous cellulose aminomethanate solution into an aqueous solution containing 9% caustic and 1% zinc oxide was prepared. The solutions were mixed and tested for filterability index(4.5).

A first film was cast from the polymer dope using a 30 mil draw down on glass plates and thereafter neutralized at 25° C. in a typical coagulation/regeneration acid bath of 11% sulfuric acid and 20% sodium sulfate for 10 minutes. The resulting gel cellulose aminomethanate film was washed in lukewarm water to neutral pH and dried on 16.5 cm plastic hoops to 5% moisture content at 90° C.

The dried film tested as having a rewet Mullen burst strength of 17 psi. and approximately 40 g/m2 basis weight.

A second film was cast from the polymer dope(10° C.) using a 30 mil draw down on a glass plate. A 14 lb. basis weight abaca fiber based saturating web was then laid on the draw down and the dope was allowed to penetrate the web for 2 minutes. The thus fiber reinforced drawdown was neutralized, coagulated, regenerated, dried as above for the first film and tested to have a rewet Mullen Burst strength of 42 psi. Similar films made from polymer dope allowed to stand several hours at 6° C. were slightly clearer and had higher burst strengths, however the material gelled in about 3 days at this temperature.

What is claimed is:

1. In a process for synthesizing cellulose aminomethanate wherein cellulose is slurried in aqueous sodium hydroxide solution with urea and steeped to form a mixture, the improvement comprising, maintaining the temperature of the slurried mixture at from about 2 degrees centigrade to about −15 degrees centigrade and steeping for a time sufficient to permit swelling of the cellulose and distribution of the urea to available hydroxy units within the swelled cellulose structure.

2. The process of claim 1 wherein the aqueous solution comprises from about 2 to about 10% by weight sodium hydroxide.

3. The process of claim 1 wherein the aqueous solution comprises from about 12 to about 35% by weight urea.

4. The process of claim 1 wherein the weight ratio of the aqueous urea containing sodium hydroxide solution to cellulose is less than about 15:1.

5. The process of claim 4 wherein the weight ratio is from about 6:1 to about 15:1.

6. The process of claim 4 wherein the weight ratio is from about 8:1 to about 12:1.

7. The process of claim 1 wherein the mixture is maintained at from about 2 degrees centigrade to about −15 degrees centigrade for less than about one hour.

* * * * *